US 6,571,640 B2

(12) United States Patent  
Harrison

(10) Patent No.: US 6,571,640 B2
(45) Date of Patent: Jun. 3, 2003

(54) METHOD AND APPARATUS FOR MEASURING A FLEXURAL CHARACTERISTIC OF A GOLF CLUB SHAFT

(75) Inventor: John W. Harrison, Glendale, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 09/823,780

(22) Filed: Mar. 30, 2001

(65) Prior Publication Data

US 2002/0139195 A1 Oct. 3, 2002

(51) Int. Cl.[7] .............................................. G01L 1/24
(52) U.S. Cl. ........................... 73/800; 73/854; 73/65.03
(58) Field of Search ........................... 473/289; 33/551; 358/107; 73/800, 854, 65.03; 156/189; 242/7.01; 29/402.1

(56) References Cited

U.S. PATENT DOCUMENTS

| 4,713,686 | A | * | 12/1987 | Ozaki et al. ................. 358/107 |
| 4,889,575 | A | | 12/1989 | Roy ............................ 156/189 |
| 5,285,680 | A | | 2/1994 | Sun ............................ 73/65.03 |
| 5,429,008 | A | | 7/1995 | Matsumoto et al. ... 73/862.639 |
| 5,515,615 | A | * | 5/1996 | Twigg et al. .................. 33/551 |
| 5,951,410 | A | * | 9/1999 | Butler et al. ................. 473/223 |
| 6,183,375 | B1 | * | 2/2001 | Weiss .......................... 473/289 |

* cited by examiner

Primary Examiner—Max Noori
(74) Attorney, Agent, or Firm—Darrell F. Marquette; John D. Titus

(57) ABSTRACT

An apparatus and a method for measuring the flexural characteristic of a golf club shaft. The apparatus includes a table having a clamping structure for clamping the golf club shaft thereto. A data collection system having a computer coupled to an image recording device measures the amount of deflection of the golf club shaft before and after a bending moment is applied to the golf club shaft. The stiffness of the golf club shaft is determined from the amount of deflection.

24 Claims, 4 Drawing Sheets

METHOD AND APPARATUS FOR MEASURING A FLEXURAL CHARACTERISTIC OF A GOLF CLUB SHAFT

BACKGROUND OF THE INVENTION

This invention relates, in general, to an apparatus for measuring physical properties of golf club shafts and, more particularly, to a method and apparatus for measuring a flexural characteristic of a golf club shaft.

In the field of designing, modifying, and fitting golf clubs, it is advantageous to know the physical properties of the golf club shaft as well as the physical properties of the golf club head. It is common in the industry to rate clubs based on the flexural stiffness designated typically by the terms: Extra Stiff (XS); Stiff (S); Firm (F); Regular (R); Average (A); and Ladies (L). The flexural stiffness is important because it determines the maximum bending as well as the first bending mode frequency of the shaft and, therefore by selecting the appropriate shaft stiffness, the club can be optimized for the swing speed of the particular golfer. The torsional stiffness of the golf club is also important because it determines the maximum windup of the club head relative to the shaft and the torsional frequency at which the club head oscillates about the axis of the golf club shaft during the swing. For optimum performance, in addition to matching the flexural stiffness of the shaft to the player's swing speed, the torsional stiffness of the shaft should also be matched to the club head swing weight and the player's swing speed. Another important physical property of the golf club shaft is its frequency of oscillation because it provides a reproducible and reliable index of shaft flexibility. Further, the frequency of oscillation allows frequency matching of golf clubs to form a set of golf clubs which have a substantially uniform "feel" to the golfer.

A common prior art apparatus for determining the deflection of a golf club shaft is illustrated in FIG. 1. What is shown in FIG. 1 is a flex board 10 having a golf club shaft clamping structure 11, a plurality of mirrors 12, and a golf club shaft 13. Golf club shaft 13 has a butt end 14, i.e., a grip end, and a tip end 15, i.e., a head end. Clamping structure 11 includes a receptacle 17 for receiving butt end 14 of golf club shaft 13 and a clamp 18 for securing golf club shaft 13 to flex board 10. Flex board 10 further includes calibrated scales 19 along each mirror 12. Calibrated scales 19 are marked in inches and are used to measure the deflection or flexure of golf club shaft 13 when a mass 20 is attached to tip end 15 of golf club shaft 13. Typically, golf club shaft 13 is manually adjusted by an operator after insertion into clamping structure 11 to ensure that it is properly mounted to flex board 1 0. The operator then adds mass 20 to tip end 15 and records the number of inches golf club shaft 13 is deflected at a predetermined distance along the golf club shaft. For example, the deflection can be measured at the location indicated by reference number 21 or at the location indicated by reference number 22. Although this technique has been used for many years, it is dependent on human operators who may introduce variation into the measurements because of parallax error and operator fatigue. In addition, this technique does not permit making continuous flex measurements along the golf club shaft, i.e., the measurement is made at a discrete point along the golf club shaft.

SUMMARY OF THE INVENTION

The present invention provides a method and an apparatus for accurately determining the flexure of stiffness of a shaft by measuring the deflection of the shaft. In a preferred embodiment of an apparatus for measuring the deflection of a golf club shaft incorporating features of the present invention, a clamping mechanism is provided for securing one end of a shaft to a support structure of the apparatus. A flexing mechanism is provided to create a bending moment on the shaft by moving one end of the shaft. In one embodiment, the flexing mechanism comprises a pulley system in which a mass is coupled to the end of the shaft not secured to the support structure. In another embodiment, the flexing mechanism comprises a stop against which the end of the shaft not secured to the support structure is pushed. An image recording device creates an image of the shaft before and after the creation of the bending moment on the shaft. The image is transmitted to a computer which creates a model that mathematically describes the deflection of the golf club shaft. A plot in accordance with the mathematical model can be displayed on a computer screen. The flexure of stiffness of the golf club shaft is determined from the deflection.

DESCRIPTION OF THE PREFERRED EMBODIMENT

Figure 1:
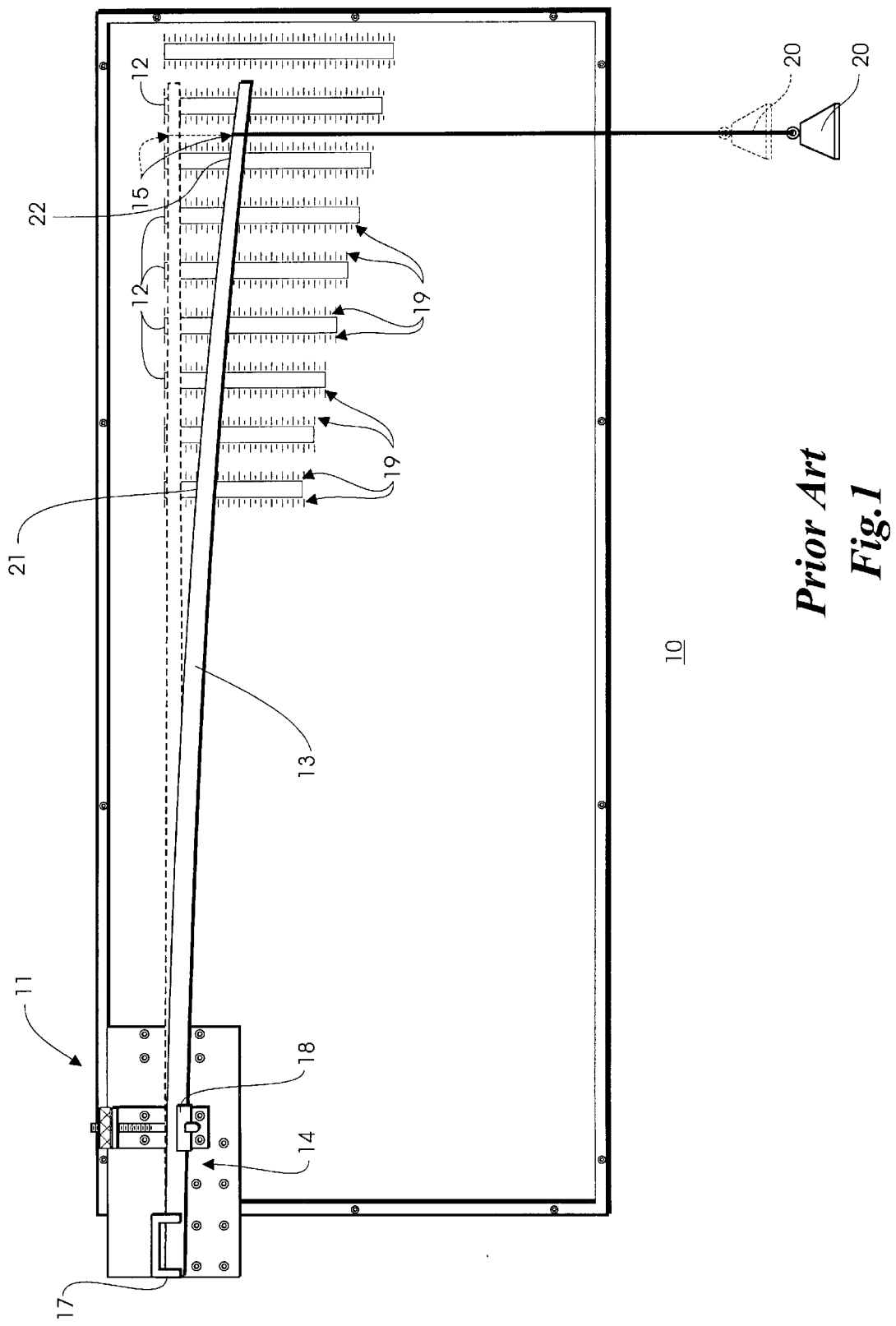
FIG. 1 is a frontal view of a flex board for measuring flexure of a golf club shaft in accordance with the prior art.
Figure 2:
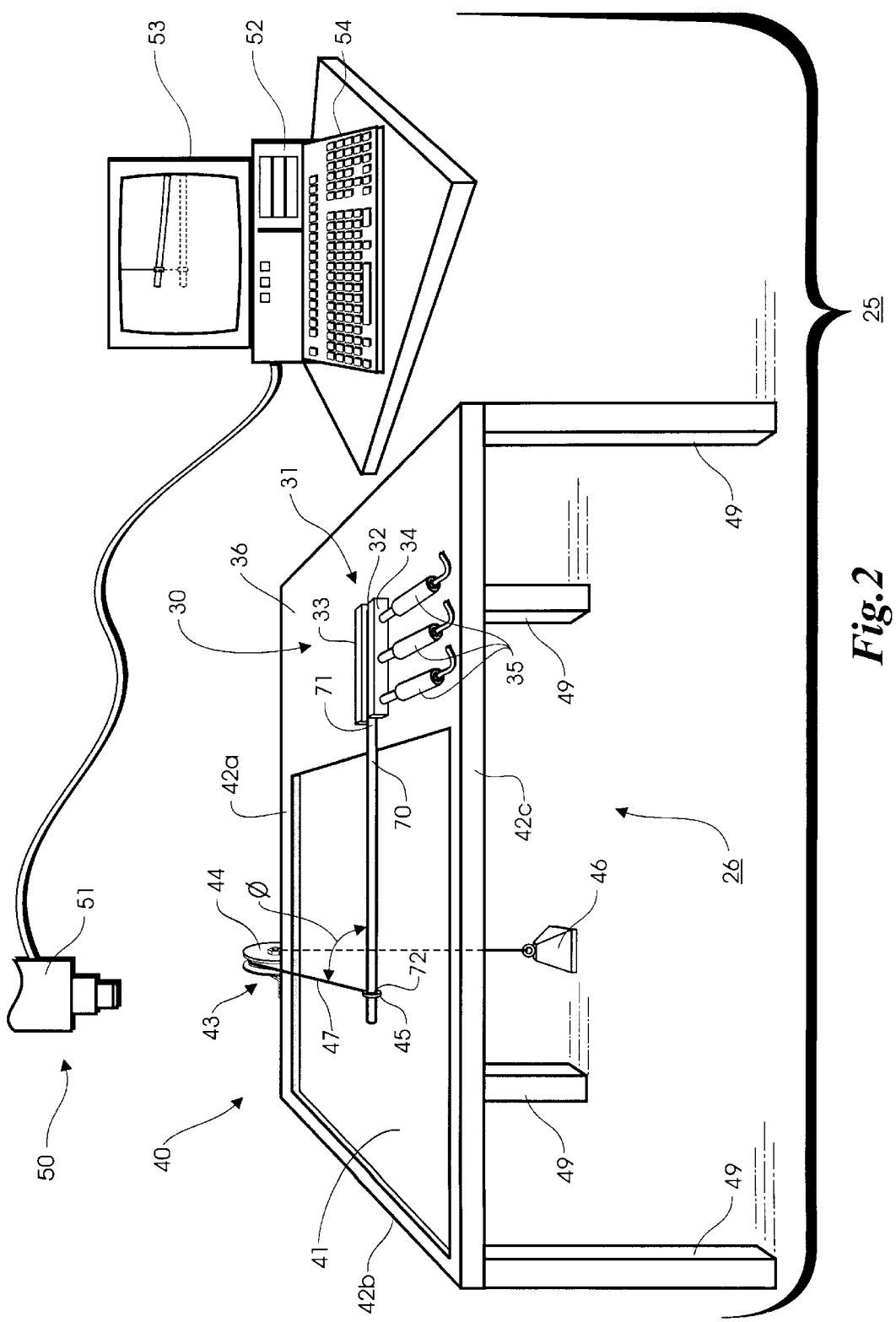
FIG. 2 is a partial schematic elevational view of an apparatus incorporating features in accordance with the preferred embodiment of the present invention.

FIG. 2 is a partial schematic elevational view of an apparatus 25 incorporating features of the present invention. Apparatus 25 comprises a recessed table 26 supported by legs 49, a clamping portion 30, a flexure portion 40, and a data collection portion 50. In accordance with a first embodiment, clamping portion 30 includes a pneumatically actuated clamp 31 having a shaft end-stop 32, a shaft clamping-stop 33, and a movable shaft clamping bar 34 coupled to a plurality of pneumatic cylinders 35 that are mounted to a substantially planar support surface 36. By way of example, movable shaft clamping bar 34 is a unitary structure that applies a uniform force along the portion of the butt end 71 of a golf club shaft 70 that is in contact with shaft clamping-stop 33. An advantage of a shaft clamping-stop 33 and movable shaft clamping bar 34 in accordance with the present invention is that they mitigate bowing of the golf club shaft 70.

It should be understood that the configuration of clamping portion 30 is not a limitation of the present invention. For example, clamp 31 can be actuated by electrical or hydraulic means. Alternatively, stops 32 and 33 can be a unitary structure rather than two separate structures as shown and described with reference to FIG. 2. Further, and briefly referring to FIG. 3, an alternative embodiment of clamping portion 30 may comprise a rotatable annular clamp 37 having an adjustable inner diameter. The butt end 71 of golf club shaft 70 is inserted into annular clamp 37, which has an inner diameter that is larger than the diameter of golf club shaft 70. After insertion, clamp 37 is actuated so that its inner diameter is reduced until it firmly grips the butt end 71 of golf club shaft 70.

Figure 3:
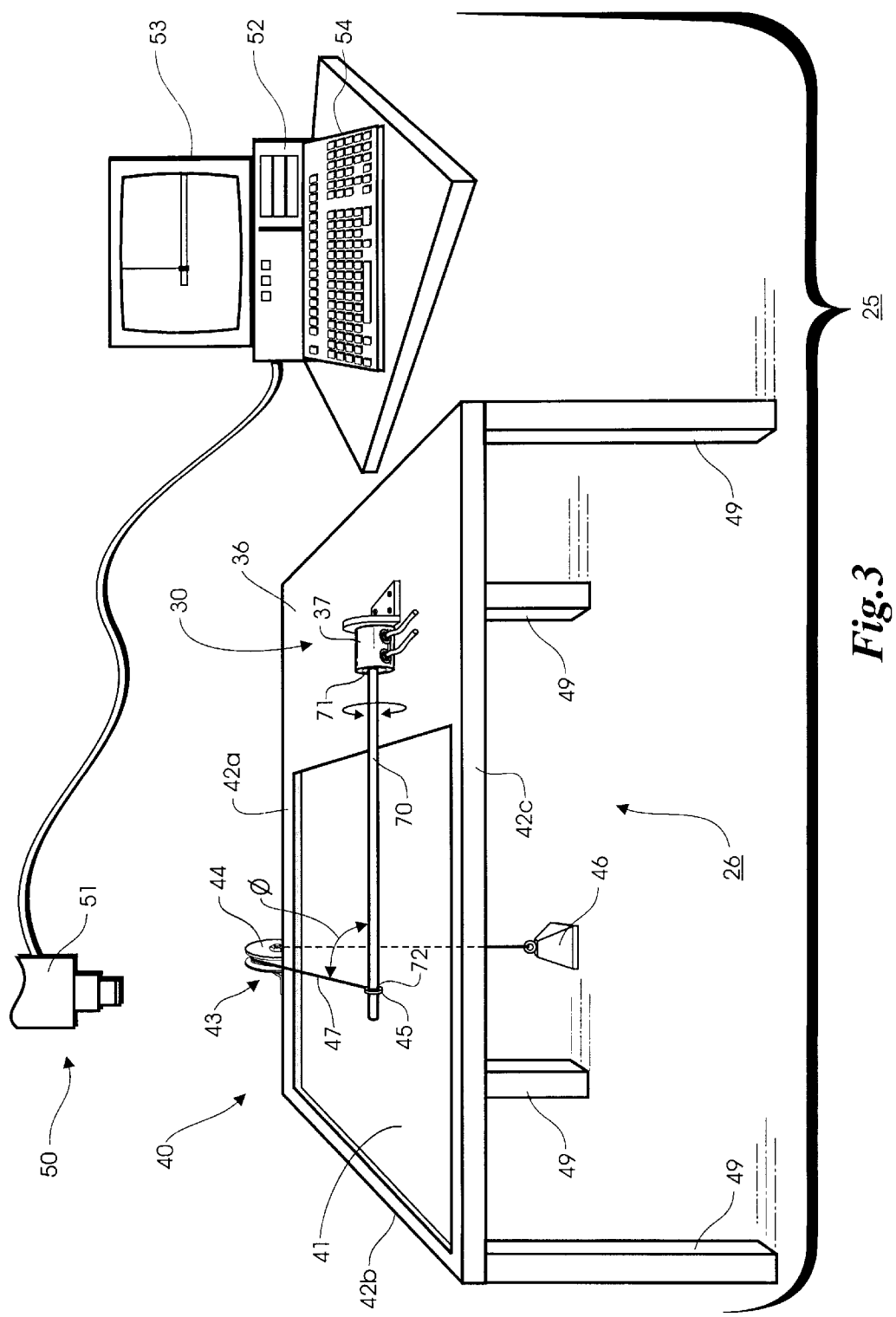
FIG. 3 is an elevational view of an apparatus similar to the apparatus of FIG. 2 in accordance with an alternative embodiment of the present invention.

A useful feature of the embodiment of the clamping portion shown in FIG. 3 is that clamp 37 is rotatable. As those skilled in the art are aware, golf club shafts are not symmetric along their longitudinal axes. Hence, they tend to bend more in one direction. By being rotatable, annular clamp 37 enables an operator to rotate a golf club shaft coupled therein about its longitudinal axis and thereby take flex measurements in any direction perpendicular to the length of golf club shaft 70. It should be understood that flex is the distance the golf club shaft is deflected from an original position at some fixed point along the golf club shaft and a flex point is the location where the greatest change in flex along the golf club shaft occurs.

Referring again to FIG. 2, flexure portion 40 comprises a table top 41 having sidewalls or lips 42a, 42b and 42c. In accordance with one embodiment of the present invention, table top 41 is a white acrylic material capable of diffusing light. Preferably, table top 41 is parallel to support surface 36 and vertically spaced apart from support surface 36 by between about one inch (2.5 centimeters) and three inches (7.5 centimeters). In other words, sidewalls 42a, 42b and 42c preferably have a height of between one inch and three inches. A pulley system 43 is coupled to the table 26 adjacent the sidewall 42a. Pulley system 43 comprises a pulley 44 through which a fastener 45 is coupled to a mass 46 via a cord 47. Suitable weights for mass 46 are one pound, two pounds, three pounds, four pounds, and five pounds. By way of example mass 46 weighs four pounds. It should be noted that the heavier the mass, the greater the force exerted on the golf club shaft 70 and, therefore, the greater the deflection or flexure of the golf club shaft 70. This increased weight provides a more precise measurement of the deflection, hence a more precise measurement of the stiffness of the golf club shaft 70.

Preferably, pulley system 43 is adjustable so that pulley 44 is movable along the sidewall 42a to maintain an angle θ of substantially ninety degrees between cord 47 and the portion of golf club shaft 70 adjacent fastener 45. This maximizes the force exerted on golf club shaft 70.

Figure 4:
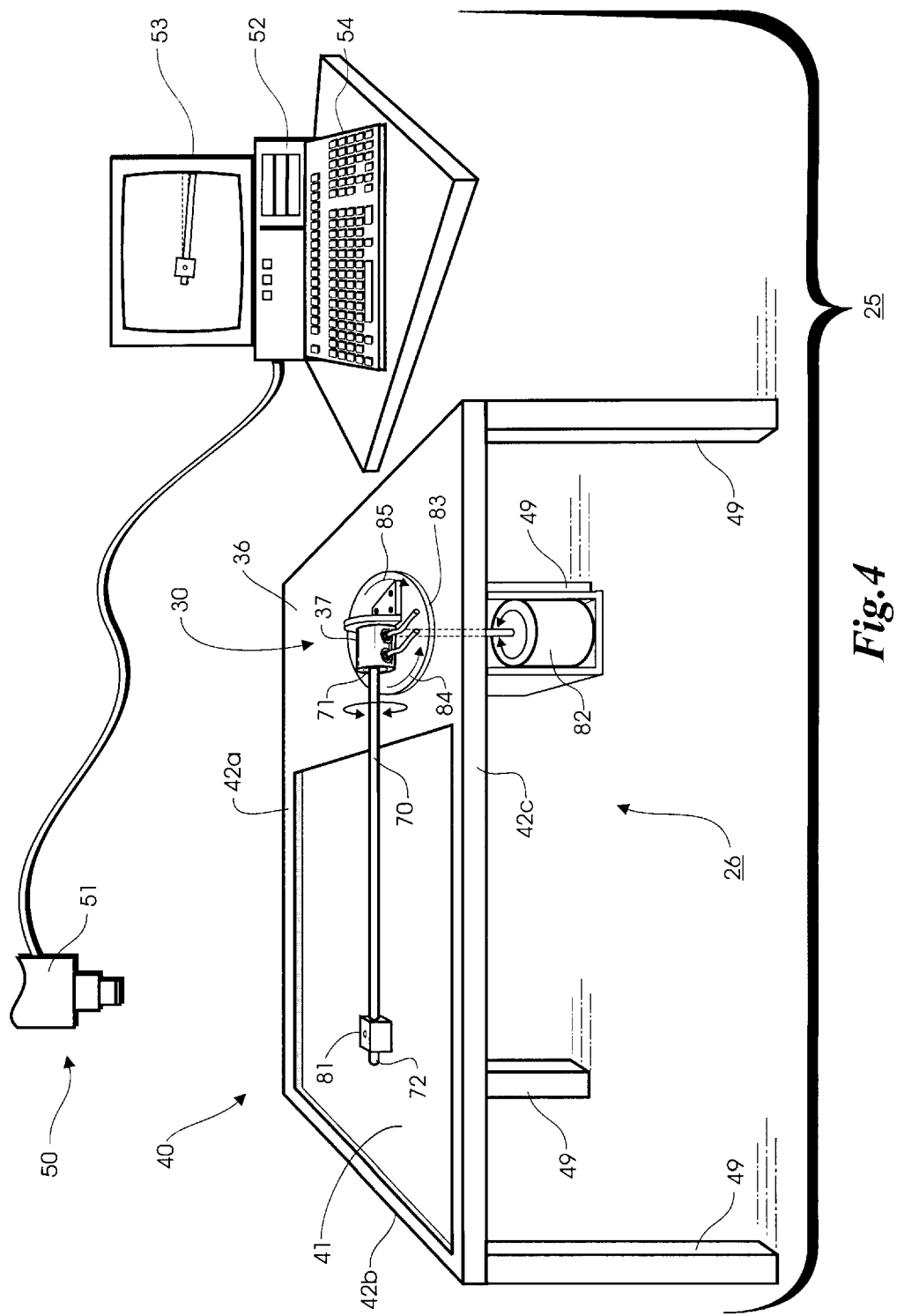
FIG. 4 is an elevational view of an apparatus similar to the apparatus of FIG. 2 in accordance with another embodiment of the present invention.

Briefly referring to FIG. 4, another embodiment for creating a bending moment in accordance with the present invention is shown. In the embodiment illustrated in FIG. 4, the bending moment is generated using a deflection stop 81 and a motor 82 coupled to a pivotable or rotatable platform 83. More particularly, deflection stop 81 is positioned adjacent the tip end 72 of golf club shaft 70 and motor 82 is coupled to rotate platform 83 in the directions indicated by arrows 84 and 85. Platform 83 is mounted on support surface 36. By way of example, deflection stop 81 is a pin coupled to table top 41. When the motor 82 is switched on or activated, portion 83 is rotated, which in turn moves the butt end 71 of the golf club shaft 70, such that the tip end 72 of the golf club shaft 70 is pushed against pin 81. This movement creates the bending moment on golf club shaft 70. The harder it is pushed against pin 81 the greater the bending moment.

Data collection portion 50 includes an image recording device 51 such as, for example, a camera, coupled to a computer 52. Preferably, camera 51 is a video camera or a digital still-camera that sends a digitized image to computer 52, which generates a mathematical model of the digitized image using a least squares curve fit technique. Results may be displayed on a conventional screen or display 53 in response to inputs from camera 51 or in response to operator inputs through keyboard 54. Although camera 51, computer 52, screen 53, and keyboard 54 are shown as being coupled by cables, it should be understood this is not a limitation of the present invention. For example, communication between any of camera 51, computer 52, screen 53, and keyboard 54 may be by signals transmitted via wireless means or non-wireless means, e.g., solid media such as copper, optical fibers, etc.

It should be noted that camera 51 introduces parallax error into the images it generates. However, because the camera 51 and the golf club shaft 70 are in a fixed relationship, the parallax error can be modeled mathematically. The mathematical model of the parallax error can then be incorporated into the mathematical models describing the flex measurement to compensate for the parallax error introduced by camera 51.

To carry out the measurement, the butt end 71 of the golf club shaft 70 is placed adjacent shaft end-stop 32 and shaft clamping-stop 33. Preferably, butt end 71 is placed flush against stops 32 and 33. An advantage of using stops 32 and 33 is that for each golf club shaft 70 placed in clamping portion 30 the same length of golf club shaft is clamped, thereby eliminating a potential source of measurement variation. Then, movable shaft clamping bar 34 is moved towards butt end 71 by actuating pneumatic cylinders 35 until clamping bar 34 contacts butt end 71. Pneumatic cylinders 35 apply a sufficient pressure to movable shaft clamping bar 34 to securely clamp golf club shaft 70 during deflection measurement without damaging shaft 70. An advantage of configuring movable shaft clamping bar 34 as a solid bar is that golf club shaft 70 does not bow within clamping portion 30 when a force is applied to tip end 72 of golf club shaft 70. Bowing within clamping portion 30 introduces variation into the measurement at the tip end 72 of golf club shaft 70. It should be understood that the particular configuration of clamping bar 34 is not a limitation of the present invention. For example, clamping bar 34 may be comprised of a plurality of sections, i.e., two sections, three sections, etc.

In a first measurement condition or state, the deflection of golf club shaft 70 is measured without a mass 46 attached to tip end 72. Camera 51 is activated to create a pixel image of golf club shaft 70 under this condition, i.e., before creating a bending moment on the golf club shaft 70. The pixel image is transmitted to computer 52, which scans the image on a column-by-column basis using an optical digitizing device (not shown) and creates a table of values describing the golf club shaft image such that the description can be plotted in a two-dimensional coordinate system. Computer 52 then generates a mathematical model of the shape of golf club shaft 70 in accordance with the values in the table. Suitable mathematical models comprise a polynomial equation, a spline equation, etc. The shape of the golf club shaft 70 in accordance with the mathematical model is then displayed on screen or display 53. As those skilled in the art are aware, higher order polynomial equations provide a better curve fit, however they tend to be very complex; therefore, it is preferable that the polynomial equation be of fourth order or less.

To verify the accuracy of the mathematical model, the digital image of the golf club shaft 70 may be superimposed on the image generated in accordance with the mathematical model. If the images are not superimposable, the model may be in error indicating that the model generation procedure should be repeated.

In a second measurement condition or state, a fastener or golf club shaft attachment 45 is attached to tip end 72 of golf club shaft 70 and mass 46 is lowered, thereby exerting a force or bending moment on shaft 70 and causing it to flex. Camera 51 is once again activated to create another pixel image of golf club shaft 70 under this second measurement condition, i.e., after creating a bending moment on golf club shaft 70. The pixel image is transmitted to computer 52, which scans the image on a column-by-column basis and creates a second table of values describing the flex of the golf club shaft 70 such that an image of the bent or flexed golf club shaft 70 can be plotted in a two-dimensional coordinate system. Computer 52 then generates another mathematical model of the shape of golf club shaft 70 in accordance with the values in the second table. By way of example, the mathematical model is a polynomial equation. To verify the accuracy of the mathematical model, the digital image of the flexed golf club shaft 70 may be superimposed on the image generated in accordance with the mathematical model. If the images are not superimposable, the model may be in error indicating that the model generation procedure should be repeated. The shape of the golf club shaft 70 in accordance with the mathematical model is then displayed on screen 53.

Computer 52 subtracts the mathematical model of the golf club shaft 70 having no mass attached to its tip end from the mathematical model having the mass attached to its tip end 72 to generate a mathematical model of the deflection of the golf club shaft 70. In other words, computer 52 subtracts the mathematical model of the unflexed golf club shaft from that describing the flexed golf club shaft to calculate a difference between the first image and the second image and thereby create a new mathematical model. Computer 52 can then plot the mathematical model of the deflection and display it on screen 53. Thus, a continuous profile of the deflection along the length of the golf club shaft is generated.

The average flexural stiffness of the golf club shaft 70 can be determined from the amount of deflection in conjunction with the following equation:

$$\text{Stiffness}=(PL^3)/(3Y) \text{ pound inches}^2$$

where:

P is the weight of a mass attached to the end of the golf club shaft (pounds);

L is the length of the golf club shaft (inches); and

Y is the deflection of the golf club shaft (inches).

Computer 52 can be programmed to automatically calculate the stiffness of golf club shaft 70 in accordance with the equation.

By now it should be appreciated that a flex measurement system and a method have been provided. In accordance with one embodiment of the present invention, the flex measurement system includes a camera 51 coupled to a computer 52, wherein the camera 51 creates images of a golf club shaft 70 before and after flexure. The computer 52 then generates a mathematical model of the deflection along the length of the golf club shaft 70, which is used to calculate the flexural stiffness of the golf club shaft 70. An advantage of this invention is that it provides a measure of the flexural stiffness along the length of the golf club shaft 70 rather than at a single point on the golf club shaft 70. Another advantage of the present invention is that the use of the camera 51 in combination with the computer 52 allows a more accurate and repeatable measurement by eliminating variability introduced by inconsistent golf club shaft placement within the clamping portion, operator fatigue, operator error, parallax error, etc. Another advantage of the present invention is that the clamping mechanism such as clamp 31 reduces the error introduced by the bowing of the butt end 71 of the golf club shaft 70 as occurs in conventional shaft fastening systems.

It will be understood that the clamp 37 may be a fixed non-rotatable clamp and the table top 41 may be coplanar with support surface 36, i.e., the table top 41 will not be recessed below support surface 36. Further, the apparatus of the present invention may be incorporated into a universal fixture that includes a golf club shaft vibrational measurement system such as disclosed in the co-pending patent application entitled APPARATUS FOR MEASURING TORSIONAL STIFFNESS OF A GOLF SHAFT, filed Aug. 13, 1999 as Ser. No. 09/374,193, and the co-pending patent application entitled METHOD AND APPARATUS FOR MEASURING A VIBRATIONAL CHARACTERISTIC OF A GOLF CLUB SHAFT filed concurrently with the present application.

What is claimed is:

1. A method for measuring a flexural characteristic of a golf club shaft, comprising:

providing the golf club shaft, wherein the golf club shaft has a first end and a second end;

rigidly fixing the first end of the golf club shaft to a support structure;

initializing a deflection measurement of the golf club shaft, the initialization performed under a first measurement condition;

creating a bending moment on the golf club shaft to cause said golf club shaft to bend, the movement of said golf club shaft under the application of said bending moment defining a bending plane, the static position of raid golf club shaft under the application of said bending moment defining a second measurement condition; and optically measuring a deflection of the golf club shaft under said second measurement condition utilizing an image recording device, said image recording device positioned out of the plane of bending of said golf club shaft and having an optical axis substantially normal to the plane of bending of said golf club shaft.

2. The method of claim 1, wherein creating a bending moment includes applying a force to the golf club shaft.

3. The method of claim 2, wherein applying the force to the golf club shaft includes using a motor and a pin.

4. The method of claim 2, wherein applying the force to the golf club shaft includes using a mass.

5. The method of claim 4, wherein the mass has a weight selected from the group of weights including one pound, two pounds, three pounds, four pounds, and five pounds.

6. The method of claim 1, wherein optically measuring the deflection of the golf club shaft includes:

creating a first image of the golf club shaft before creating the bending moment;

creating a second image of the golf club shaft after creating the bending moment; and calculating a difference between the first image and the second image.

7. The method of claim 6, further including generating a first mathematical model describing the first image, generating a second mathematical model describing the second image, and generating a third mathematical model, the third mathematical model being a difference between the first and second mathematical models.

8. The method of claim 7, wherein at least one of the first and second mathematical models is one of a polynomial equation or a spline equation.

9. The method of claim 1, further including using the deflection of the golf club shaft to calculate a stiffness of the golf club shaft.

10. The method of claim 9, wherein creating a bending moment includes applying a force to the golf club shaft.

11. An apparatus for measuring deflection of a golf club shaft, comprising:
a support structure having first and second portions, the first portion including a clamping mechanism for clamping one end of said golf club shaft;
a flexing mechanism for creating a bending moment on said golf club shaft thereby causing said golf club shaft to deflect, the deflection of said golf club shaft defining a bending plane; and
an image recording system for optically measuring displacement of said golf club shaft in response to the bending moment, said image recording device being mounted in a position out of the plane of bending of said golf club shaft and having its optical axis substantially normal to the plane of bending of said golf club shaft.

12. The apparatus of claim 11, wherein said flexing mechanism comprises a pulley system.

13. The apparatus of claim 11, wherein said flexing mechanism includes a mass coupled to a fastener.

14. The apparatus of claim 11, wherein said flexing mechanism comprises a deflection stop and a motor.

15. The apparatus of claim 11, wherein the image recording system comprises a camera.

16. The apparatus of claim 11, further including a computer system adapted to receive signals from the image recording system.

17. The apparatus of claim 16, wherein the signals are one of wireless or non-wireless signals.

18. The apparatus of claim 11, wherein the clamping mechanism includes stops for mitigating bowing of said golf club shaft.

19. The apparatus of claim 18, wherein said clamping mechanism further includes a first stop substantially perpendicular to a second stop and a movable stop that is pneumatically actuated.

20. An apparatus for measuring deflection of a golf club shaft, comprising:
a frame having a clamp for clamping one end of said golf club shaft;
a pulley system coupled to a second portion of the frame, said pulley system creating a bending moment on said golf club shaft thereby causing said golf club shaft to deflect, the deflection of said golf club shaft defining a bending plane, said pulley system including a pulley, a mass, and a golf club shaft attachment, wherein said golf club shaft attachment is coupled to said mass through said pulley; a
an image recording device mounted to said frame in a position out of the plane of bending of said golf club shaft with its optical axis substantially normal to the plane of bending of said golf club shaft, whereby said image recording device records a side view image of said golf club shaft for optically measuring a static deflection of said golf club shaft.

21. The apparatus of claim 20, further including a computer coupled to said image recording device.

22. The apparatus of claim 21, wherein said image recording device is capable of sending wireless or non-wireless communications signals to said computer.

23. The apparatus of claim 21, wherein said computer includes programming for converting the deflection into a measure of a stiffness of said golf club shaft.

24. The apparatus of claim 20, wherein said image recording device is one of a video camera or a digital camera.

* * * * *